United States Patent [19]

Sellers

[11] Patent Number: 5,337,653
[45] Date of Patent: Aug. 16, 1994

[54] COFFEE BREWING APPARATUS

[75] Inventor: Timothy M. Sellers, Broomall, Pa.

[73] Assignee: Gross-Given Manufacturing Co., St. Paul, Minn.

[21] Appl. No.: 918,173

[22] Filed: Jul. 23, 1992

[51] Int. Cl.$^5$ ............................................. A47J 31/00
[52] U.S. Cl. ..................................... 99/289 R; 99/287
[58] Field of Search .............. 99/289 R, 289 T;289 D, 99/289 P, 302 P, 287, 302 R, 283, 286, 279, 300

[56] References Cited

U.S. PATENT DOCUMENTS

| | | | |
|---|---|---|---|
| 3,349,690 | 10/1967 | Heier | 99/283 |
| 3,478,673 | 11/1969 | Burney | 999/302 R |
| 3,660,117 | 5/1972 | Neely | 99/289 |
| 3,754,462 | 8/1973 | Brill | 99/302 P |
| 4,271,753 | 6/1981 | Neely | 99/289 R |
| 4,715,270 | 12/1987 | Harada | 99/289 R |
| 4,791,859 | 12/1988 | King | 99/302 R |
| 4,873,916 | 10/1989 | Piscaer | 99/289 R |
| 4,885,986 | 12/1989 | Grossi | 99/289 R |

Primary Examiner—Timothy F. Simone
Assistant Examiner—Patrick Brinson
Attorney, Agent, or Firm—Panitch Schwarze Jacobs & Nadel

[57] ABSTRACT

An apparatus for brewing a coffee beverage from coffee grounds and hot water includes a housing and a base member within the housing. The base member incorporates a generally horizontal porous surface. A brewing cylinder is located within the housing and is located above and generally axially aligned with the porous surface of the base member. The brewing cylinder is movable from a first position in which the bottom of the brewing cylinder is sealingly engaged with the base member and surrounds at least a portion of the porous surface and a second position in which the brewing cylinder is separated from the base member. A mixing channel has a first end communicating with the interior of the brewing cylinder. The channel receives a predetermined portion of coffee grounds and hot water for initially mixing together the coffee grounds and the hot water and for inserting the mixture into the brewing cylinder generally tangentially to the inner surface of the brewing chamber so that the coffee grounds and hot water move around the inner surface of the brewing chamber while moving downwardly for stirring the coffee grounds and water to brew the coffee beverage in an accelerated manner.

11 Claims, 5 Drawing Sheets

COFFEE BREWING APPARATUS

BACKGROUND OF THE INVENTION

The present invention relates generally to an apparatus for brewing fresh coffee and, more particularly, to an improved coffee brewing apparatus which employs a modified cylindrical brewing chamber to provide enhanced or accelerated extraction of color, flavor and aroma from ground coffee to provide a high quality coffee beverage in an efficient and consistent manner.

There are many types of apparatus and processes employed for brewing fresh coffee in a commercial environment. One very popular process comprises simply pouring a predetermined quantity of hot water at a controlled rate over a bed of coffee grounds contained within a paper filter or other porous supporting medium in such a manner that the hot water seeps downwardly to engage the coffee grounds and to thereby remove or extract from the coffee grounds the soluble materials. The coffee beverage (water and soluble materials from the coffee grounds) then passes downwardly through the supporting medium and is captured within a suitable container, such as a carafe, mug, cup or the like. The quality of the coffee beverage produced utilizing such a pour-over method is generally very good, but the process is relatively slow because of the relatively long period of time necessary for all of the hot water to pass through the coffee bed and for the coffee beverage to be completely collected in the container. Thus, for example, brewing a pot of approximately one half gallon of coffee utilizing the pour-over process takes between three and one-half to four minutes. In addition, the pour-over method is prone to overextraction of coffee solubles due to uncontrollable and inconsistent water seepage paths through the coffee bed.

Another commercial method of brewing coffee in a more automated manner involves the use of a generally cylindrical brewing chamber which is open at both ends. A piston is positioned above the brewing chamber and a screen-like member is positioned below the brewing chamber. At the beginning of a brewing cycle, the brewing chamber is moved downwardly to sealingly engage the screen-like member and a predetermined quantity of ground coffee is inserted into the brewing chamber so that a bed of coffee is supported upon the screen-like member. A predetermined quantity of hot water is then inserted into the brewing chamber and the piston is moved downwardly in the brewing chamber, thereby forcing the hot water under pressure through the coffee grounds and then through the openings in the screen-like member for the actual brewing of the coffee. A container is positioned below the screen-like member for capturing the coffee beverage. Once the brewing has been completed, the piston is withdrawn from the brewing chamber, the brewing chamber is moved upwardly, and the coffee grounds are removed from the screen-like member. While such a brewing chamber apparatus has the advantage of being able to provide freshly brewed coffee in a relatively short period of time, the quality of the coffee produced utilizing such a brewing chamber apparatus is generally not as high as the quality obtained using the above-described pour-over method.

The present invention applies some of the principles employed in the pour-over coffee brewing method, along with some of the advantages of the automated brewing chamber method, to provide an improved brewing chamber apparatus. With the improved brewing chamber apparatus, coffee grounds are exposed to the hottest water as the water leaves the spout and prior to introduction into the brewing chamber to provide a thorough wetting of the coffee grounds to allow the extraction process to begin as early as possible, and so that the highest temperature water is mixed with the coffee for enhanced dissolving of soluble components of the ground coffee. In addition, the coffee and water are stirred as they move into the brewing chamber to provide a high degree of surface contact between the coffee grounds and the water and to continuously wash the coffee grounds with the portion of the extracting solution or water containing the lowest concentration of coffee solubles. This action operates to accelerate the extraction of color, flavor and aroma from the ground coffee and to reduce the likelihood of overextraction or uneven extraction. As a result, a coffee brewing apparatus made in accordance with the present invention produces a high quality coffee beverage approaching that produced utilizing the above-described pour-over method, but yet provides the coffee beverage in the faster, more efficient manner characteristic of a brewing chamber apparatus to provide a labor time savings to the operator of the brewing apparatus.

SUMMARY OF THE INVENTION

Briefly stated, the present invention is directed to an apparatus for brewing a coffee beverage from coffee grounds and hot water. The apparatus comprises a housing and a base member within the housing. The base member includes a generally horizontal porous surface. A brewing cylinder is located within the housing. The brewing cylinder has an inner surface, an outer surface, a generally open top and a generally open bottom. The brewing cylinder is located above and generally axially aligned with the porous surface of the base member. The brewing cylinder is movable from a first position in which the bottom of the brewing cylinder is sealingly engaged with the base member and surrounds at least a portion of the porous surface and a second position in which the brewing cylinder is separated from the base member. A mixing channel has a first end communicating with the interior of the brewing cylinder. The channel receives a predetermined portion of coffee grounds and a predetermined quantity of hot water for initially mixing together the coffee grounds and the hot water and for inserting the mixed coffee grounds and the hot water into the brewing cylinder generally tangentially to the inner surface of the brewing chamber so that the coffee grounds and the hot water move around the inner surface of the brewing chamber while moving downwardly for stirring the coffee grounds and water to brew the coffee beverage. A piston is sized to tightly engage the inner surface of the brewing cylinder. The piston is movable from a first position generally axially aligned with and above the brewing cylinder and a second position within the brewing cylinder, whereby movement of the piston from the first position toward the second position results in the piston engaging the inner surface of the brewing cylinder and pressurizing the interior of the brewing cylinder to force the coffee beverage through the porous surface of the base member for separation of the coffee beverage from the coffee grounds.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred, it being understood, however, that the invention is not limited to the precise arrangement and instrumentalities disclosed.

In the drawings:

FIGS. 3(a)–3(c) are front elevational schematic views of the brewing assembly located within the apparatus of FIG. 1;

FIGS. 5(a)–5(c) are enlarged front elevational views of the wiper assembly of FIG. 4 during operation of the apparatus of FIG. 1.

DESCRIPTION OF PREFERRED EMBODIMENT

Figure 1:
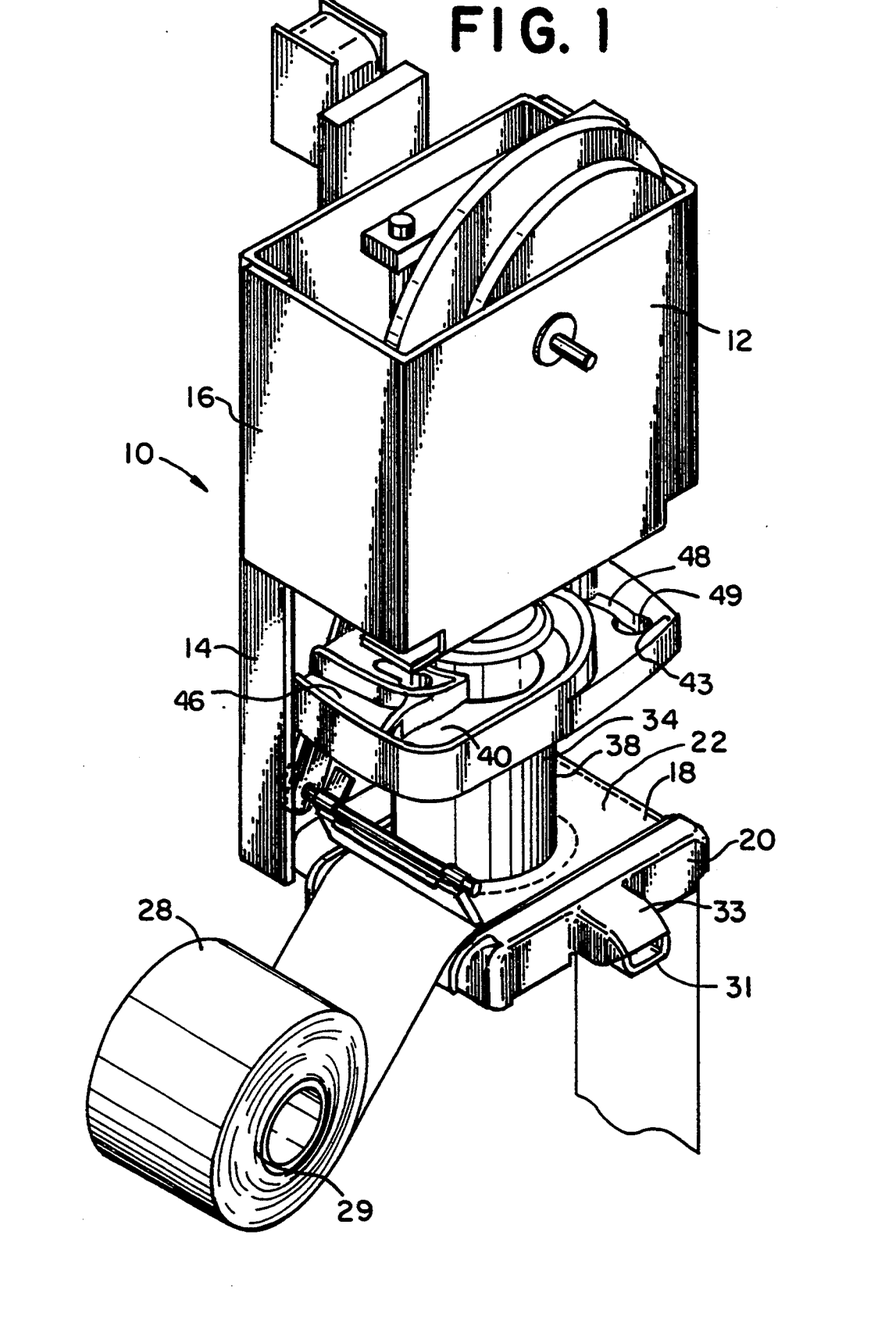
FIG. 1 is a perspective view of an apparatus for brewing coffee in accordance with the present invention.

Referring to the drawings, wherein like numerals indicate like elements throughout, there is shown in FIG. 1 an apparatus 10 for brewing liquid coffee from coffee grounds and hot water in accordance with the present invention. The apparatus 10 includes a housing 12 comprising a back plate 14 and a three sided frame 16 attached to the upper portion of the back plate 14. The three sided frame 16 and the upper portion of the back plate 14 preferably form a rectangular enclosure for containing a cam shaft (not shown) and various mechanical and drive components (not shown in detail) of the apparatus 10. The details of a typical apparatus motor, cam shaft assembly and other mechanical components are disclosed in U.S. Pat. No. 3,660,117 assigned to Refreshment Machinery Inc., the details of which are incorporated herein by reference. The housing 12 is preferably constructed out of a durable high strength material such as, but not limited to, a plastic material or sheet metal. It is to be understood by those skilled in the art that the housing 12 may take the form of any shape, such as cylindrical or trapezoidal without departing from the scope and spirit of the present invention.

The rectangular enclosure is preferably constructed such that retaining screws (not shown) are received by mating holes within the back plate 14 and the three sided frame 16 and attached thereto by washers or lugs (not shown) having a greater diameter than the diameter of the mating holes.

Figure 2:
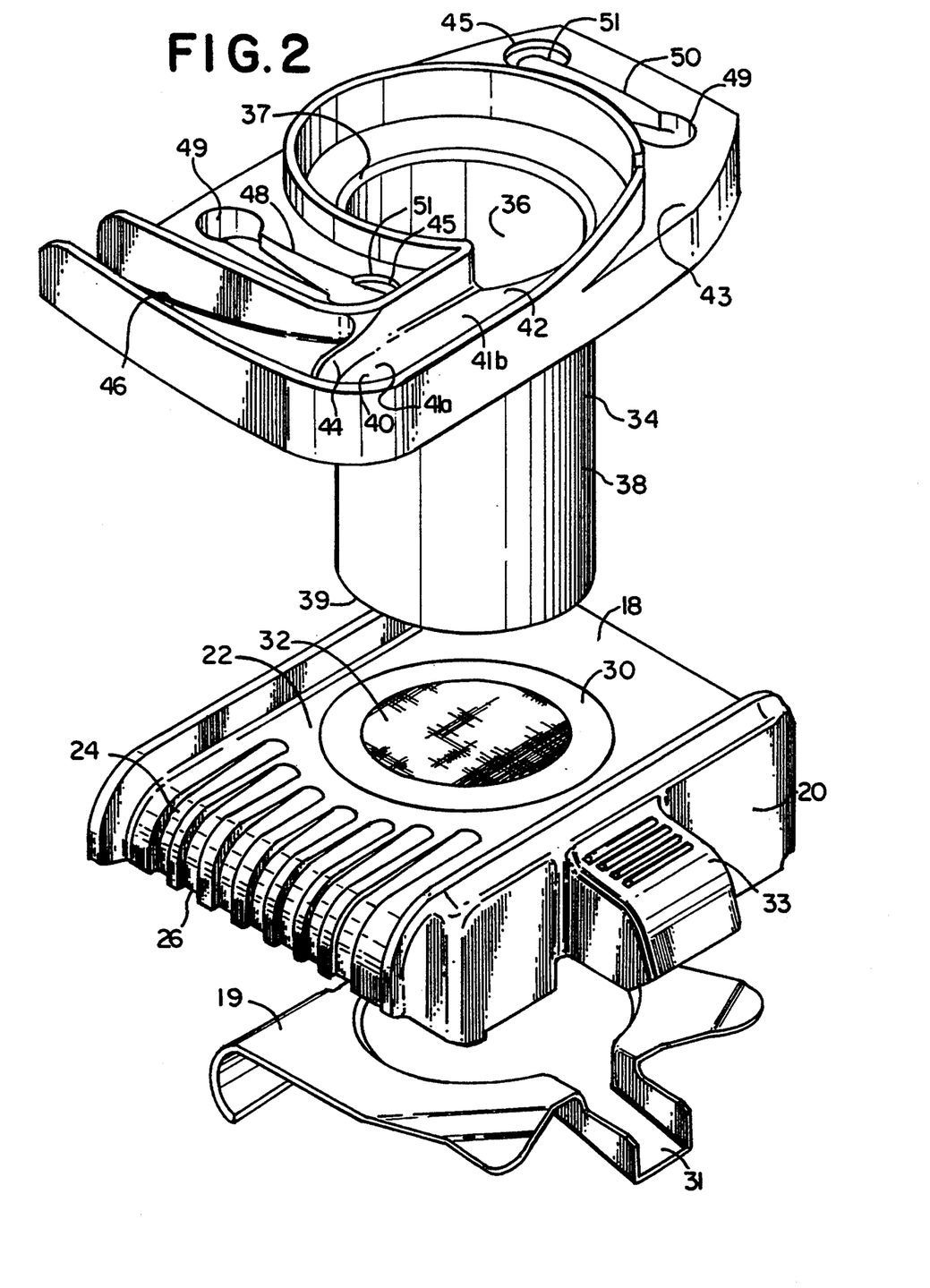
FIG. 2 is an enlarged exploded perspective view of a portion of the brewing assembly of the apparatus of FIG. 1.

Referring to FIGS. 1 and 2, a base member 18 is attached to the bottom portion of the back plate 14 and is located beneath the rectangular enclosure. The base member 18 is preferably secured to the back plate 14 by a retainer (not shown) which snaps into an indent (not shown) located on the back plate 14. The base member 18 is designed to be easily removed from the back plate 14 of the housing 12 for ease of cleaning, repair, maintenance, etc. The base member 18 is preferably formed of a durable, high strength material, in the present embodiment, high impact plastic and includes three side walls 20 and a top wall 22.

The top wall 22 includes a curved portion 24 having a plurality of indentations or grooves 26 for drainage of excess water or coffee beverage from the top wall 22. Preferably, the top wall 22 is downwardly inclined slightly toward the side having the grooves 26 to facilitate drainage.

A filter 28 (FIG. 1) is placed over the top wall 22 of the base member 18 to filter out fine coffee granules from the coffee beverage. In the preferred embodiment, the filter 28 is a continuous paper filter which is mounted on a roll 29, in the configuration shown in FIG. 1, or any other configuration to suit any particular paper roll positioning. However, it is to be understood by those skilled in the art that the filter may be made from any suitable porous material without departing from the scope and spirit of the present invention. A new portion of the filter 28 is placed over the base member 18 after each cup of coffee is brewed.

The filter roll 29 is preferably mounted on a support rod (not shown) which is mounted proximate the apparatus 10 and in a position which allows it to turn freely so as to allow sufficient feeding of the paper filter 28 onto the top wall 22 of the base member 18. The filter roll 29 is designed to be freely rotatable. Prior to starting the brewing cycle, a portion of the filter 28 is rolled off the filter roll 29 in a manner hereinafter described and is placed on the top wall 22 of the base member 18. The width of the filter 28 is preferably, but not necessarily the same width as the top wall 22 so that the filter substantially covers most or all of the top wall 22 of the base member 18.

During the brewing cycle, the filter 28 is maintained in place by a brewing cavity 34 as will be described in detail hereinafter. When the brewing cycle is completed, a wiper blade 80 sweeps across the top wall 22 of the base member 18 and pulls or drags the used or soiled filter 28 and used coffee grounds with it. The soiled filter 28 and coffee grounds are received by a receptacle (not shown) located below and extending adjacent to the coffee apparatus 10. As the soiled filter 28 is removed from the top wall 22 of the base member 18, a clean portion of filter 28 is removed from the filter roll 29 and placed on the top wall 22 of the base member 18.

The base member 18 further includes a compression gasket 30 which surrounds a screen insert 32 which is designed to take the maximum brewing pressure and to allow the brewed coffee to pass therethrough into a chamber (not shown) within the base member 18 without allowing the coffee grounds to pass therethrough. The screen insert 32 is preferably a porous member having relatively small pores, preferably of micron size, for preventing small coffee granules from entering the base chamber and mixing in with the coffee beverage. The screen insert 32 is snapped into position by the compression gasket 30 which is flush with the top wall 22 of the base member 18. If no paper filter 28 is available, the screen insert 32 may act as a filter.

The base member 18 further includes a base funnel 19 (FIG. 2) which is located directly beneath the top wall 22 and is captured within the base member 18 for forming a chamber (not shown) for receiving the brewed coffee beverage. A spout 33 is integrally formed within one of the side walls 20 of the base member 18 and works in conjunction with a funnel spout 31 of base funnel 19 for pouring the coffee beverage into a container (not shown) suitably positioned beneath the distal end of the spout 33 and funnel spout 31. The funnel spout 31 is preferably designed to slope generally downward so that the coffee mixture flows directly or indirectly through another liquid funneling or directing device into the container. In the preferred embodiment, the container can be either a single serving container, such as a cup or mug, or it may be a multiple serving container, such as an urn, carafe, pitcher or coffee pot depending upon user preference and the machine's configuration, without departing from the scope and spirit of the present invention.

Figure 3A:
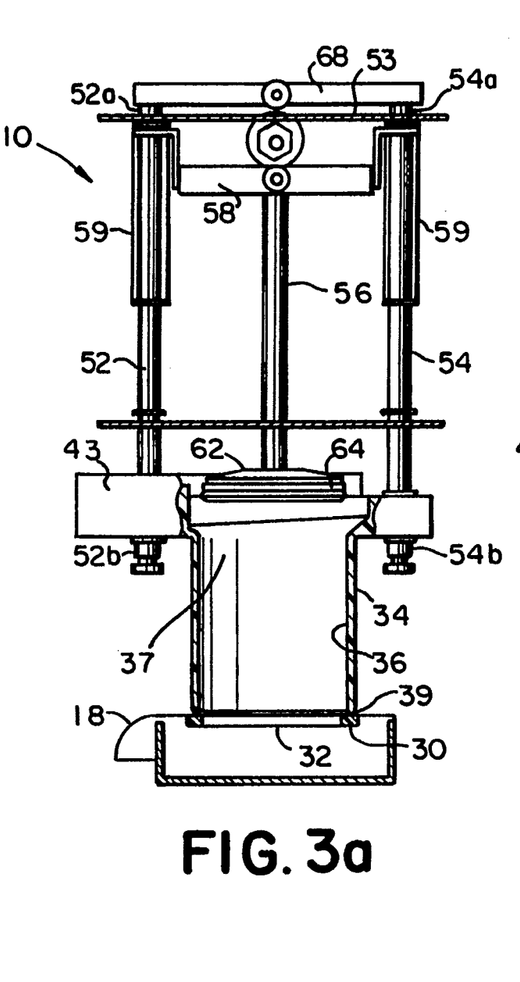
Figure 3B:
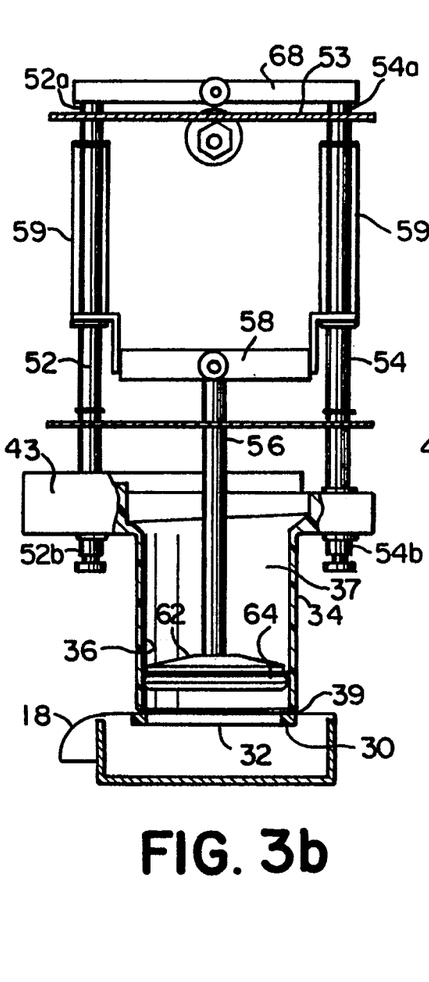
Figure 3C:
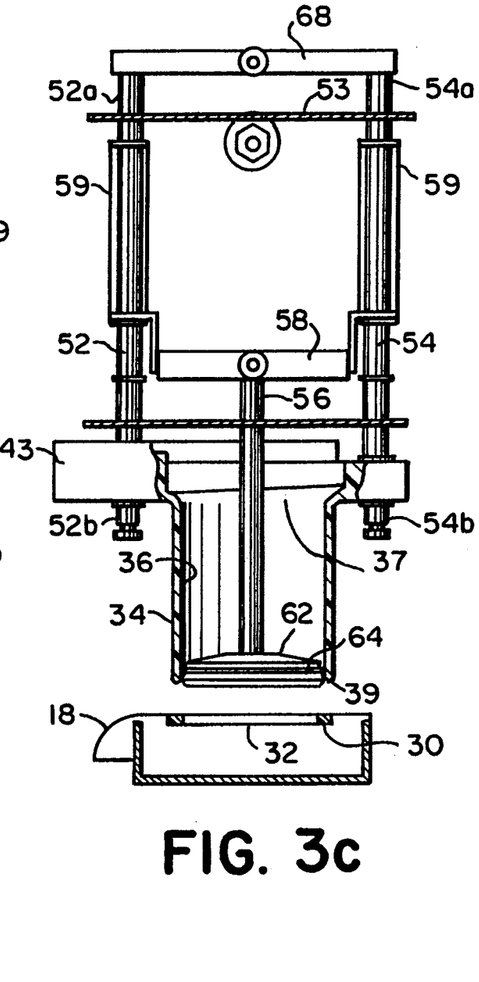

The brewing cavity 34 is located within the housing 12 directly above the base member 18 and includes an inner surface 36 (FIG. 3(a)-3(c)), an outer surface 38, a generally open top 37 and a generally open bottom 39. In the preferred embodiment, the brewing cavity 34 is preferably cylindrical in shape. However, it is to be understood by those skilled in the art that the brewing cavity 34 can be any suitable shape such as, but not limited to, rectangular or hexagonal in shape without departing from the scope and spirit of the present invention. The brewing cavity 34 is preferably made of a high strength, durable, easily cleanable material, preferably a high impact plastic material. However, it is to be understood by those skilled in the art that the brewing cavity 34 may be made from any suitable material without departing from the scope and spirit of the present invention.

The brewing cavity 34 is preferably located above and generally axially aligned with the screen insert 32 of the base member 18. At the beginning of the brewing cycle, the brewing cavity 34 is placed flush with the base member 18 to form a partially sealed chamber. The brewing cavity 34 is movable between a first position in which the bottom of the brewing cavity 34 is sealingly engaged with the filter 28 and the compression gasket 30 which is surrounding the screen insert 32 and supported by the base member 18 (FIG. 3(a)), and a second position in which the brewing cavity 34 is separated from the base member 18 (FIG. 3(c)) as will be described in more detail hereinafter.

Located directly above the brewing cavity 34 and in the present embodiment integrally formed with the brewing cavity 34 is a flange 43 including a mixing channel 40 which has a first end 42 for communicating with the interior of the brewing cavity 34. The mixing channel 40 receives a predetermined portion of coffee grounds and a predetermined portion of hot water for initially mixing together the coffee grounds and the hot water. The mixing channel 40 includes an area 41a, 41b for receiving the hot water and coffee grounds. The coffee is placed at an open area 41b of the mixing channel 40 and hot water is inserted at a radial end 41a as well. In the preferred embodiment, the mixing channel 40 is positioned proximate the upper end of the brewing cavity 34 and slopes generally downwardly. A lip 44 prevents the coffee mixture from flowing back into an overflow trough 46.

The mixing channel 40 is designed to include a generally downward sloping surface. When the coffee grounds and hot water are inserted into the mixing channel 40, the water flows from the water spout (not shown) into the radial end 41a of the mixing channel 40 and continues on down the slope of the mixing channel 40 to engage the coffee grounds very soon after leaving the hot water spout (not shown) with only minimal heat dissipation. By having the water contact the coffee grounds essentially as the water is being dispensed, the extraction process begins as early as possible and ensures that the coffee grounds are thoroughly wetted. This also allows the extraction process to begin when the water is at its highest temperature and causes the coffee mixture to be brewed as soon as the hot water is poured thereon for producing an even blending of the coffee grounds and hot water.

The mixture of the coffee grounds and hot water flow down the generally horizontally sloping mixing channel 40 such that the water and coffee grounds are generally tangential to the inner surface 36 of the brewing cavity 34 as the mixture of coffee grounds and hot water enters the top of the brewing cavity 34. As a result, the coffee grounds and the hot water move around the inner surface 36 of the brewing cavity 34 while moving downwardly to the filter 28 causing a stirring effect on the coffee grounds and water to help brew the coffee beverage.

Because the coffee grounds and hot water are traveling in a tangential direction, a continuous stirring of the coffee mixture occurs resulting in a subsequent uniform agitation of the solid coffee grounds within the captive body of hot water. The stirring motion imparted to the coffee grounds and hot water mixture is carried out through the duration of the brew cycle and provides a means for accelerating the extraction process by continuously washing the concentrated solution within or surrounding the coffee grounds with the portion of the extracting solution containing the lowest concentration of coffee soluble solids. This provides the highest concentration difference between the coffee grounds and the beverage. By brewing the coffee mixture in this manner, the coffee grounds are in contact with the hot water for a shorter period of time yet a higher amount of surface contact occurs between the coffee grounds and hot water due to the stirring action.

In addition, a controlled timing of the coffee mixture occurs such that the water inlet time out lasts the coffee grounds' deposit time to ensure that the coffee grounds are washed into the brewing cavity 34 in their entirety. This leaves the mixing channel 40 clean and ready for a subsequent brew cycle. The stirring action as the mixture moves downwardly in the brewing cavity 34 also causes the coffee grounds to be pulled to the center of the brewing cavity 34 allowing for cleaner operation of the brewing apparatus. In the preferred embodiment, the brewing cavity 34 and its integral flange 43 are easily removed from the apparatus 10 for additional cleaning or maintenance.

Referring to FIGS. 3(a)-3(c), there is shown a piston assembly 56 in accordance with the present invention. The piston assembly 56 includes a pair of guide rods 52, 54 which are generally parallel to one another. Each guide rod 52, 54 has a first end 52a, 54a and a second end 52b, 54b. The first ends 52a, 54a of the guide rods 52, 54 are connected together by a horizontal bar 53. The second ends 52b, 54b of the guide rods 52, 54 are received by slots 48, 50 located on the brewing cavity flange 43. The slots 48, 50 each have a wide opening 49 at one end for initially receiving the guide rods 52, 54. Once the guide rods 52, 54 are inserted into the wide openings 49 of the slots 48, 50, the guide rods 52, 54 are slid through the slots 48, 50 until the guide rods 52, 54 reach the opposite ends each of which is a generally narrower opening 51, and come to rest in a shallow counterbore 45, slightly below the top surface of flange 43. In the preferred embodiment, the wide openings 49 are larger in dimension than the diameter of the guide rods 52, 54 and the narrow openings 51 are of generally the same dimension as the diameter of the guide rods 52, 54.

The arrangement of the guide rods 52, 54 and the flange 43 is designed so that the flange 43 and the integrally molded brewing cavity 34 may be easily removed from the brewing apparatus 10 for cleaning, service or maintenance. When the flange 43 is to be removed from the guide rods 52, 54, the brewing cavity 34 is first pulled vertically downward to clear the shallow counterbores 45. This simultaneously releases the spring pressure of two mounting springs 60. The second motion is to twist the brewing cavity 34 in a radial direction within an imaginary horizontal plane so that the guide rods 52, 54 are located within the wide openings 49 of the slots 48 and 50. The brewing cavity 34 can then be moved in a vertically downward direction to completely remove the integral flange 43 and brewing cavity 34 from the guide rods 52, 54. Replacement of the flange 43 and brewing cavity 34 after cleaning is accomplished using the same steps but in the reverse order.

A vertically moving component 58 is located between and mounted on the guide rods 52, 54. The vertical moving component 58 is slideably movable within two slide bars 59 which are located on the guide rods 52, 54. A piston 62 is connected to the vertically moving component 58 and located generally equidistant from each guide rod 52, 54. The two slide bars 59 provide constant spring pressure on the brewing cavity 34, and periodic spring pressure on the piston 62, in conjunction with two compression springs 55 captured uniaxially around each guide rod 52, 54 (see FIG. 4). Each of the guide rods 52, 54 also extend through the slots 48, 50 at an elevation below the elevation of the flange 43.

The piston 62 acts with the vertically moving component 58 of the piston assembly 56. The piston 62 is sized to tightly engage the inner surface 36 of the brewing cavity 34. The piston 62 is movable from a first position generally axially aligned with and above the brewing cavity 34 as shown in FIG. 3(a). As shown in FIG. 3(a), at the start of the brewing cycle, the vertically moving component 58 is initially located at the upper portion of the slide bars 59 which causes the piston 62 to be located just above the brewing cavity 34 to permit the hot water and coffee grounds mixture to enter the brewing cavity 34. At this point, the open bottom 39 of brewing cavity 34 is flush with the top wall 22 of the base member 18.

The piston 62 is movable to a second position (FIG. 3(b)) within the brewing cavity 34 such that movement of the piston 62 from the first position toward the second position results in the piston 62 engaging the inner surface 36 of the brewing cavity 34 and pressurizing the interior of the brewing cavity 34 to force the brewed coffee beverage through the filter 28 and the screen insert 32 of the base member 18 for separation of the coffee beverage from the coffee grounds. When the piston 62 is in the second position, the vertically moving component 58 is located at the lower portion of the slide bars 59. At this point, the open bottom 39 of the brewing cavity 34 is still flush with the top wall 22 of the base member 18 to form the brewing chamber.

Figure 4:
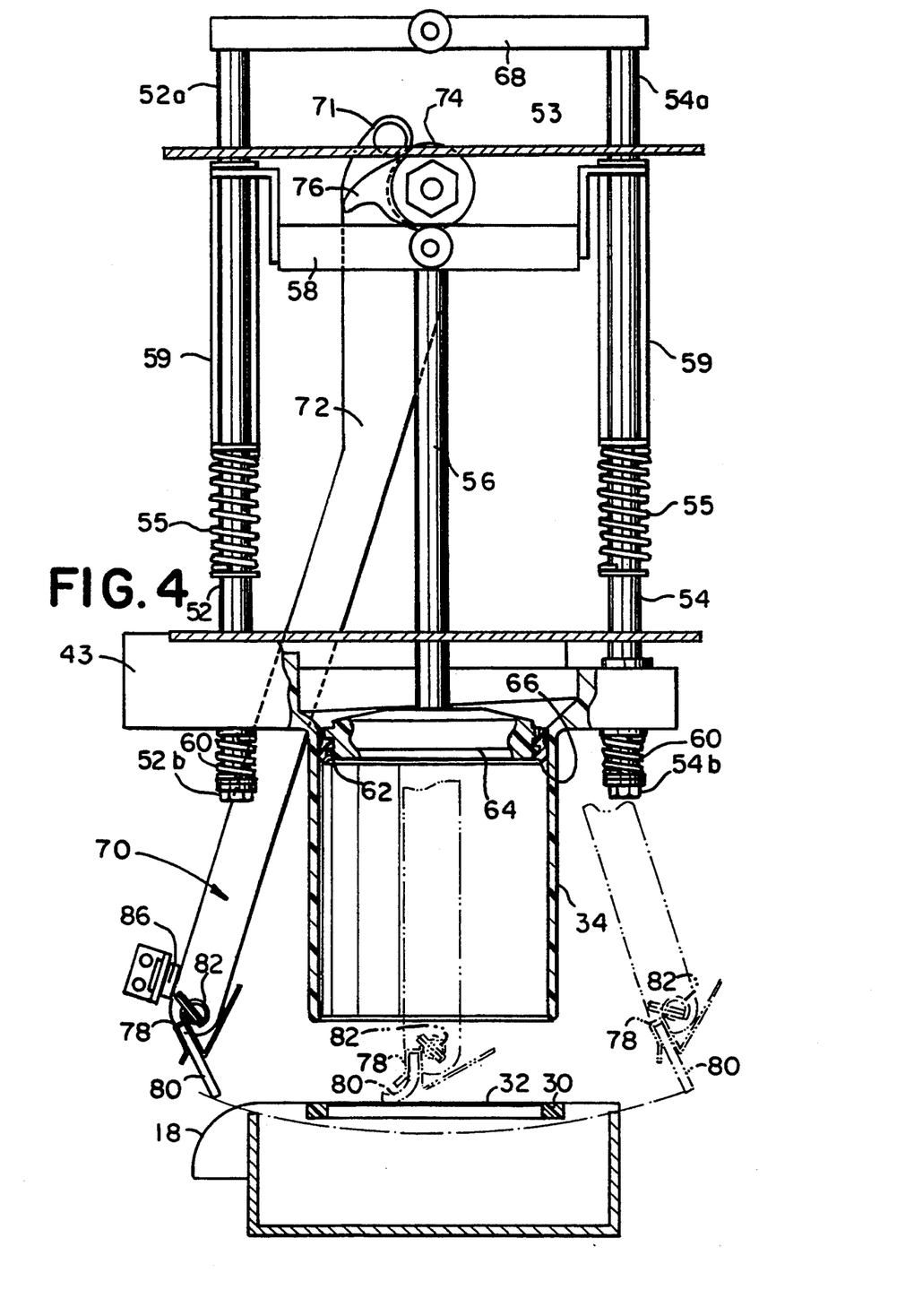
FIG. 4 is a front lateral view, partially broken away of a portion of the brewer assembly of FIGS. 3(a)–3(c) showing a wiper assembly.

As can clearly be seen in FIG. 3(a), the top opening 37 of the brewing cavity 34 is of a greater width than the diameter of the piston 62. The diameter of the main portion of the brewing cavity 34 is preferably slightly less than the diameter of the piston 62 to provide a tight seal between the piston 62 and the interior surface 36 of the brewing cavity 34. Referring to FIG. 4, the circumferential surface of the piston 62 is covered by a seal ring 64. In the preferred embodiment, the seal ring 64 is made of rubber. However, it is to be understood by those skilled in the art that the seal ring 64 can be made from any suitable material without departing from the scope and spirit of the present invention. The seal ring 64 includes a circumferential seal ridge 66 which engages the inner surface 36 of the brewing cavity 34. The ridge 66 provides a seal so that a small amount of secondary water can be deposited on the top surface of the piston 62 as the piston 62 travels downwardly through the brewing cavity 34. The seal ring 64 provides the necessary pressure to force the removal of the liquid coffee from the solid coffee grounds, and thus also prevents the small, secondary water deposit from reaching the coffee mixture during the brewing cycle.

Referring to FIG. 3(c), the piston 62 may be placed in a third position once the coffee has been brewed and the coffee beverage has been separated from the coffee grounds. A second vertically movable component 68 is associated with the brewing cavity 34 for vertically lifting the brewing cavity 34 to separate the brewing cavity 34 from the base member 18 and the filter 28 once the brewing process is completed and the coffee beverage has been separated from the coffee grounds. Once the brewing cavity 34 has been lifted a predetermined distance, the piston 62 is positioned such that the seal ridge 66 of the seal ring 64 extends at least slightly beyond the open bottom of the brewing cavity 34. The secondary water which had been deposited on top of the piston 62, typically a limited number of drops, exits the brewing cavity 34 by flowing past the seal ridge 66 of the seal ring 64, and is collected on the base member 18, being absorbed by the spent coffee grounds and paper filter 28. The secondary water passes over the seal ridge 66 of the seal ring 64 to clean the seal ring 64 and to remove any coffee grounds or other particles which may have collected on the inner surface 36 of the brewing cavity 34 or on the seal ring 64. The piston 62 is then moved back to the position shown in FIG. 3a. At this point, the brewing cycle is complete. When another cycle of coffee is to be brewed, the brewing cavity 34 is returned to the position shown in FIG. 3(a) and the brewing cycle repeats again as discussed above.

Referring to FIG. 4, there is shown a wiper assembly 70 which is associated with the piston assembly 56. The wiper assembly 70 is activated when the piston assembly 56 is in the third position shown in FIG. 3(c), with the brew cavity 34 separated from the base member 18. The wiper assembly 70 includes an arm 72 which is rotatably attached at a first end 71 to a cam 74. The cam 74 includes a tab 76 for causing the arm 72 to be movable in a range of positions. A second wiper end 78 is attached to a wiper blade 80. The wiper blade 80 causes the soiled paper filter 28 and coffee grounds to be removed from the base member 18 once the coffee beverage has been brewed. The wiper blade 80 may be made out of any suitable material such as, but not limited to, rubber, metal or plastic without departing from the scope and spirit of the present invention. The coffee grounds on the soiled paper filter are received by a receptacle (not shown) for later disposal. The wiper blade 80 also causes a fresh portion of the continuous paper filter 28 to be placed on the base member 18. If no paper filter 28 is available, the screen insert 32 may be used as a filter. As such, the wiper blade 80 removes the coffee grounds from the surface of the screen insert 32. The coffee grounds are swept off the screen insert 32 by the wiper blade 80 and deposited into the receptacle.

Figure 5A:
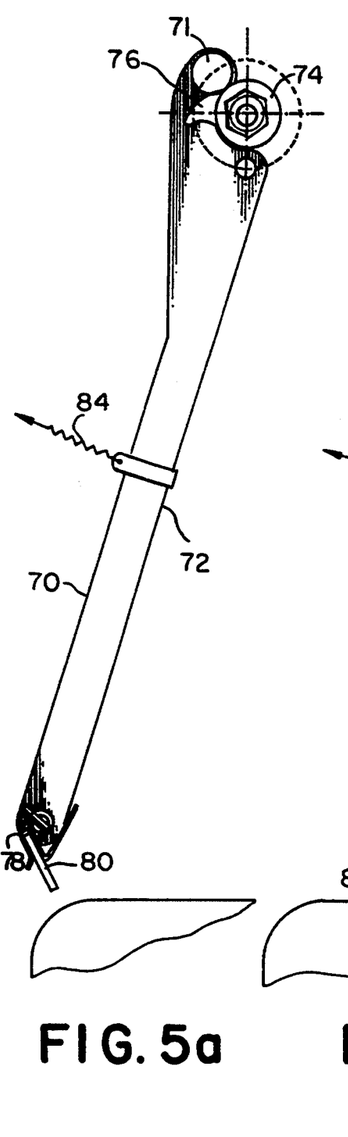
Figures 5B, 5C:
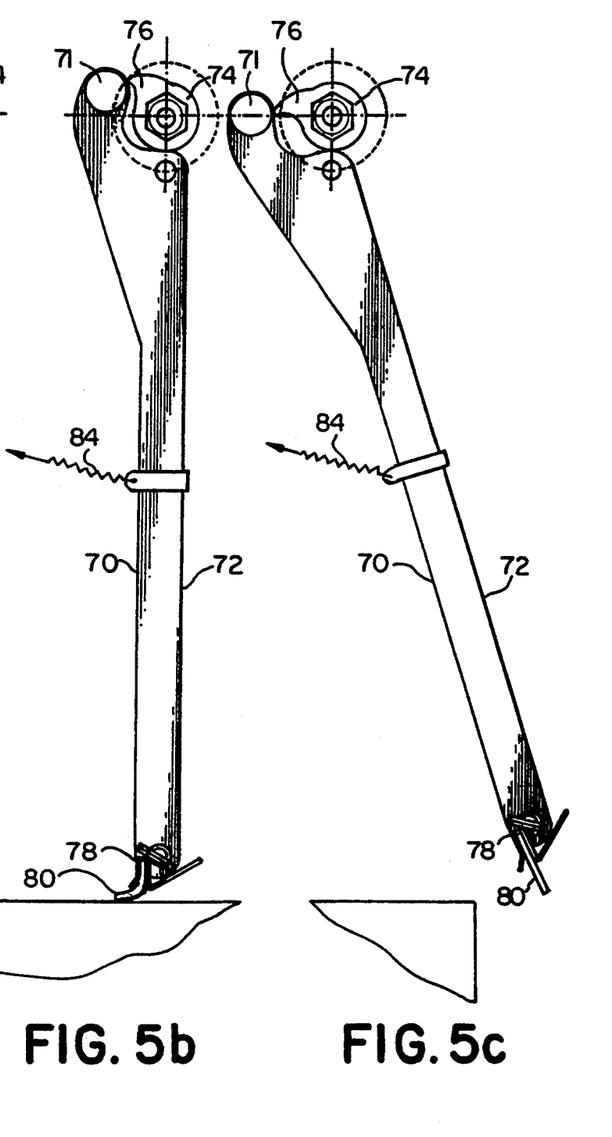

Referring to FIGS. 4 and 5, it can be seen that the wiper assembly 70 is movable within a range of positions as is determined by the orientation of the cam 74. The wiper assembly 70 is initially in a first position as shown in FIG. 5(a). The wiper blade 80 is angled toward the top wall 22 of the base member 18 and held in place by a pivot rod 82. The wiper assembly 70 is remote from the base member 18 and the cam tab 76 is in a first position. As the cam 74 rotates in a counterclockwise direction the wiper assembly slowly moves in an arcuate manner also in a counterclockwise direction. As seen in FIG. 5(b), as the wiper assembly 70 approaches the base member 18, a portion of the wiper blade 80 rotates such that it is less than perpendicular to the top wall 22 of the base member 18 and engages the continuous paper filter 28, thereby causing the soiled filter 28 and coffee grounds to travel with the wiper assembly 70. The wiper blade 80 also pulls on the filter 28 causing a clean portion of filter 28 to be removed from the filter roll 29. The base member 18 is then covered with a fresh portion of the paper filter 28 in preparation for the next brewing cycle. As the cam 74 continues to rotate the wiper assembly 70 extends past the base member 18 so that all of the soiled filter is removed from the surface of the base 18 as seen in FIG. 5(c). The wiper assembly 70 is again remote from the base member 18 but on a side opposite from its original position. As the cam 74 completes its rotation, the wiper assembly 70 is returned to its original position in a fast, steady motion caused by the tension of an extension spring 84 attached to the wiper assembly 70 at one end and the housing 12 of the apparatus 10 at the other end (not shown). The motion imparted to the wiper blade 80 by the return stroke of the wiper assembly 70 is sufficient to lift the wiper blade 80, in a counterclockwise, arcuate direction about the pivot rod 82, allowing the wiper blade 80 to clear the clean, unused paper filter 28 during the return stroke. The return motion of the wiper assembly 70 is controlled by the counterclockwise angular velocity of the cam 74, and is completed when the wiper assembly 70 comes to rest on a wiper bumper stop 86 which is attached to the housing 12.

From the foregoing description, it can be seen that the present invention comprises an apparatus for brewing a coffee beverage from coffee grounds and hot water. It will be appreciated by those skilled in the art that changes could be made to the embodiment described above without departing from the broad inventive concept thereof. It is understood, therefore, that this invention is not limited to the particular embodiment disclosed, but it is intended to cover all modifications which are within the scope and spirit of the invention as defined by the appended claims.

I claim:

1. An apparatus for brewing a coffee beverage from coffee grounds and hot water comprising:
   a housing;
   a base member within the housing, the base member including a generally horizontal porous surface;
   a brewing cylinder within the housing, the brewing cylinder having an inner surface, an outer surface, a generally open top and a generally open bottom, the brewing cylinder being located above and generally axially aligned with the porous surface of the base member, the brewing cylinder being movable from a first position in which the bottom of the brewing cylinder is sealing engaged with the base member and surrounds at least a portion of the porous surface and a second position in which the brewing cylinder is separated from the base member;
   a mixing channel having a first end communicating with the interior of the brewing cylinder, the mixing channel for receiving a predetermined portion of coffee grounds and a predetermined quantity of hot water for initially mixing together the coffee grounds and the hot water and for inserting the mixed coffee grounds and hot water into the brewing cylinder generally horizontally and generally tangentially to the inner surface of the brewing chamber so the coffee grounds and the hot water move around the inner surface of the brewing chamber while moving downwardly for stirring the coffee grounds and water to brew the coffee beverage; and
   a piston sized to tightly engage the inner surface of the brewing cylinder, the piston being movable from a first position generally axially aligned with and above the brewing cylinder and a second position within the brewing cylinder whereby movement of the piston from the first position toward the second position results in the piston engaging the inner surface of the brewing cylinder and pressurizing the interior of the brewing cylinder to force the coffee beverage through the porous surface of the base member for separation of the coffee beverage from the coffee grounds.

2. The apparatus as recited in claim 1 wherein the channel is generally downwardly sloping toward the first end.

3. The apparatus as recited in claim 2 wherein the first end of the channel communicates with the brewing cylinder proximate the top of the brewing cylinder.

4. The apparatus as recited in claim 3 wherein the channel is secured to the outer surface of the brewing cylinder.

5. The apparatus as recited in claim 4 wherein the channel and the brewing cylinder are an integral unit.

6. The apparatus as recited in claim 1, further comprising filter means located on the porous surface of the base member for filtering the coffee beverage.

7. The apparatus as recited in claim 6 wherein the filter means comprises a generally continuous web of filter material.

8. The apparatus as recited in claim 7 wherein the filter material comprises paper.

9. The apparatus as recited in claim 7 further comprising:
   wiper assembly means for removing the coffee grounds and filter from the base member once the coffee has been brewed.

10. The apparatus as recited in claim 9 wherein said wiper assembly means comprises an arm which is rotatably attached at a first end, to a cam located within the housing, the arm being movable in a range of positions, a second end of the arm including a wiper blade for removing the coffee ground from the porous surface of the base member.

11. The apparatus according to claim 10 wherein the wiper blade is pivotable with respect to the arm and is held in position by a pivot rod.

* * * * *